United States Patent [19]

Farrington

[11] 4,333,178
[45] Jun. 1, 1982

[54] OPTICAL FIBER REPEATER

[75] Inventor: Jeffrey G. Farrington, Bishop's Stortford, England

[73] Assignee: International Standard Electric Corporation, New York, N.Y.

[21] Appl. No.: 212,190

[22] Filed: Dec. 2, 1980

[30] Foreign Application Priority Data

Dec. 4, 1979 [GB] United Kingdom ................. 7941729

[51] Int. Cl.³ ............................................ H04B 9/00
[52] U.S. Cl. .................................... 455/601; 455/612; 455/613
[58] Field of Search ................... 455/601, 613, 612; 350/96.16

[56] References Cited

U.S. PATENT DOCUMENTS 4,257,124  3/1981  Porter ................................. 455/601

FOREIGN PATENT DOCUMENTS 55-99854  7/1980  Japan .................................. 455/601

*Primary Examiner*—Howard Britton
*Attorney, Agent, or Firm*—John T. O'Halloran; Alfred C. Hill

[57] ABSTRACT

In a repeater for use in an optical fiber data transmission system of the closed-loop type, the input and output transducers each have a component which, depending on its biasing conditions, can act as a photo-detector or as a light-emitter. One such device is a light-emitting diode, which if reverse-biased acts as a photo-detector. With suitable switching this enables the realization of a reversible repeater. During normal operation, the direction of transmission is reversed at the end of each message received by a remote terminal, a reply message being sent during this period of reversal, after which the remote terminal reverts to normal operation. In the event of an interruption in message reception as detected at a remote terminal, the reversal of transmission direction also occurs, so that a line break in effect converts the system to two "one-way" systems.

7 Claims, 4 Drawing Figures

OPTICAL FIBER REPEATER

BACKGROUND OF THE INVENTION

This invention relates to a multi-station data transmission system in which the stations are interconnected by optical fiber links.

A closed-loop system of the type to which the invention is applicable is shown in FIG. 1, in which there are a number of terminals such as T each connected to the loop via a repeater R. As will be seen, each terminal T is provided with a repeater R, and in addition, especially where the distance between two terminals is relatively long, there may be one or more repeaters RX which are not associated with terminals. Finally, one of the terminals such as terminal TM functions as a master terminal, but no description of this is given since it is not relevant to the present invention.

Each of the repeaters includes an opto-electrical transducer for receiving light from an incoming optical fiber link, and converting that light into electrical form. The electrically conveyed signals are then amplified in a conventional electronic amplifier, and the amplifier's output applied to an electrical-optical transducer for conversion to optical form for launching into an outgoing optical fiber link.

A drawback to a system such as described above is that the failure of any one fiber link or any one repeater will disable the whole system.

SUMMARY OF THE INVENTION

An object of the present invention is to provide a data transmission system in which the above-mentioned disadvantage is minimized or even overcome.

A feature of the present invention is the provision of a data transmission system of the closed-loop type having a plurality of stations coupled to a closed-loop comprising a first station of the plurality of stations transmitting a message to a second station of the plurality of stations, the message having a header portion including at least an address of the second station and being transmitted around the loop in a given direction from the first station to the second station, the second station responding to the address and accepting the message after which the second station transmits a reply message to the first station in a direction around the loop opposite the given direction, the transmission direction being returned to the given direction after reception of the reply message at the first station; and a reversible repeater included in each of the plurality of stations coupled to the loop to convey the message and the reply message around the loop, all of the repeaters being reversed when the direction of transmission around the loop is reversed.

In a preferred embodiment a bidirectional repeater is used so that if a fiber link or a repeater fails the switching conditions of the repeaters on the "downstream" side of the brake are reversed. Hence, the system becomes, in effect, two linear systems, each of which operates outwards from the master station.

In the arrangement to be described herein, the transducers used in the repeaters are light emitting diodes, each of which acts as a photo-detector when suitably biased.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 2:
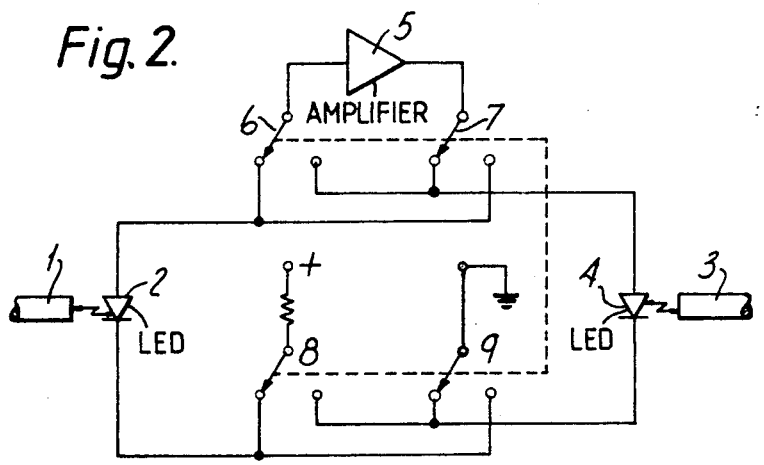
FIG. 2 is a general block diagram of a repeater for use in a system like that of FIG. 1 embodying the present invention.

In FIG. 2, a first optical fiber link 1 is terminated adjacent to a light-emitting diode (LED) 2. As will be seen later, diode 2 can function either as a light-emitting diode or as a photo-detector, in the latter case diode 2 is operated in a reverse-biased mode. The other optical fiber 3 has associated with it another light-emitting diode 4. In addition there is an electrical amplifier 5 having associated therewith switches 6, 7, 8 and 9. Although these are shown schematically as ganged mechanical switches, they would, in fact, be electronic switches, such as switching diodes.

With switches 6, 7, 8 and 9 in the positions shown, diode 2 is acting as a photo-detector diode while diode 4 acts as a light-emitting diode. Hence, light which reaches the repeater via fiber link 1 is converted to electricity by diode 2. This electricity passes via switch 6 to amplifier 5, whose output is applied via switch 7 to diode 4, which converts the electrical output of amplifier 5 into light which is launched into fiber 3. In this case diode 2 is reverse-biased via switch 8 so that it acts as a photo-detector, while diode 4 is forward-biased by switch 9 so that it acts as a light-emitting diode.

To use the repeater in the condition in which the light signals arrive via fiber 3 and leave via fiber 1, switches 6, 7, 8 and 9 are all reversed. Hence, diode 4 is reverse-biased so that it acts as a light-emitting diode and is coupled to the input of amplifier 5.

Figure 3:
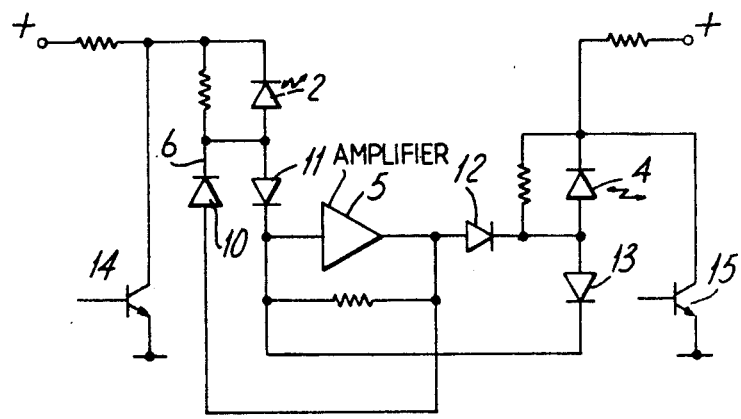
FIG. 3 is a schematic diagram of the repeater of FIG. 2 illustrating the biasing and switching arrangements in somewhat more detail.

FIG. 3 shows the switching arrangements in somewhat more detail. In addition to diodes 2 and 4 (the fiber ends are not shown) there are four switching diodes 10, 11, 12 and 13 controlled by switching transistors 14 and 15.

When diode 2 is acting as a photo-detector and diode 4 as a light-emitting diode, transistor 14 is switched off and transistor 15 is switched on. In this case diode 2 is reverse-biased while diode 4 is forward-biased. For diode 2 to act as a light-emitting diode and diode 4 as a photo-detector, transistor 14 is switched on and transistor 15 is switched off.

Figure 1:
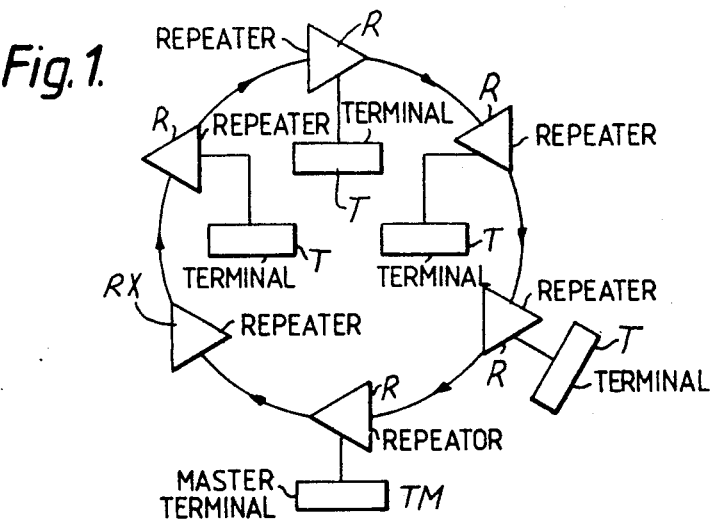
FIG. 1 is a block diagram of a closed-loop data transmission system employing repeaters in accordance with the principles of the present invention which was described hereinabove.

A data transmission system such as FIG. 1, in which the repeaters embody the principle of FIGS. 2 and 3 can be operated in the following manner:

(a) The master terminal TM originates a message word, which is sent clock-wise round the loop, addressed to one of the remote terminals T.

(b) The message word is received at the destination terminal T, and the message word is passed on round the loop by repeaters R so that it arrives back at the master station TM.

(c) When the repeaters R have repeated the TM message word, all repeaters R reverse their direction of operation in a manner described below with reference to FIG. 4. The addressed terminal T can then send a reply message to the master terminal TM round the loop in an anti-clockwise direction.

(d) After a period long enough for the reply message to have safely reached TM repeaters R revert to the original (clockwise) operation mode as described below with reference to FIG. 4.

(e) Clockwise is accepted as the normal direction of operation as long as messages continue to reach the remote terminals T at regular intervals. If reception of messages stops at any remote terminal T, that terminal tries changing direction periodically until a new mode of operation is established. This is controlled (see FIG. 4) by a simple electronic timer which is reset to zero whenever a message is received, but which initiates the periodic changes of direction when it times out.

(f) The master terminal TM normally sends it messages out clock-wise, and "expects" to receive all transmissions (or the address portions thereof) after they have passed round the loop. If the loop fails and nothing is received, the master terminal TM starts to send in both directions, in which case the loop is re-established as two independent links each of which uses time division multiplex to achieve duplex operation.

Figure 4:
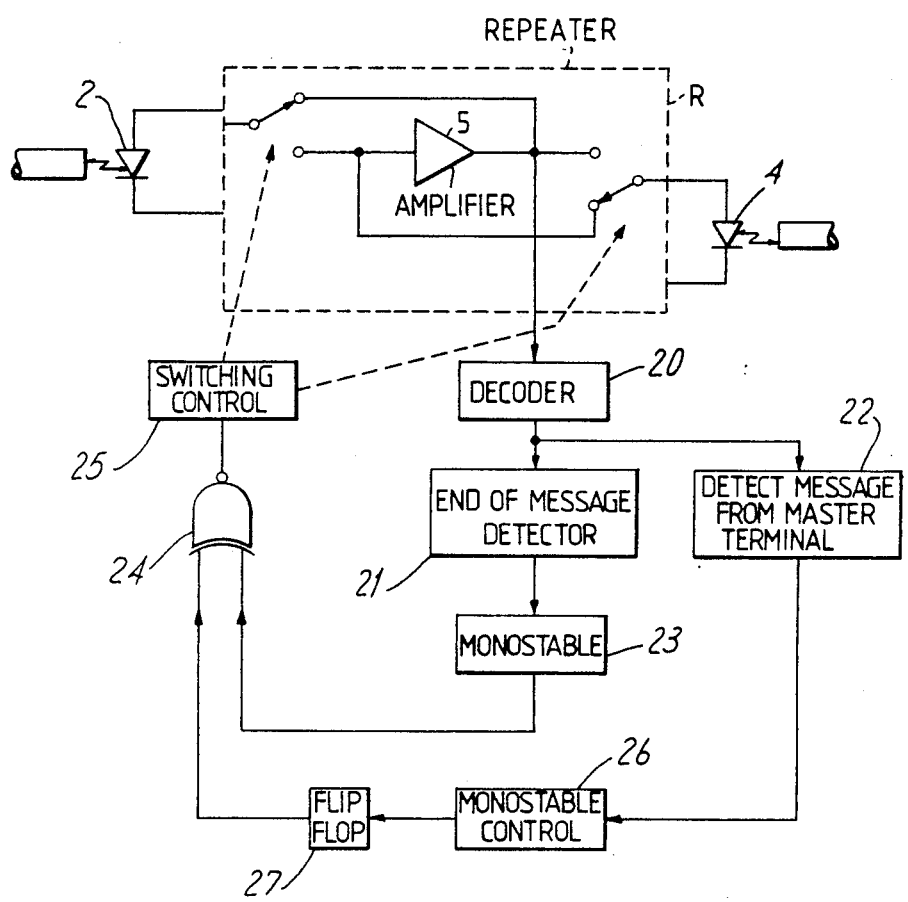
FIG. 4 is a block diagram illustrating how the reversal of the repeater is effected when the system is disturbed.

In the arrangement of FIG. 4, which shows the switching control arrangements for a remote terminal, the repeater's output is connected to a decoder 20, which passes its outputs in a manner (not shown) to the receiving equipment at that terminal. It also passes it to two detectors, a detector 21 which detects an end-of-message code, and a detector 22 which detects a message from the master terminal.

Detector 21 is enabled when reversal is needed, see notes (c) and (e), above, and when it detects an end-of-message code it switches a timer 23, shown as a monostable. Timer or monostable 23 generates an output signal whose duration equals that of a message, and this output is applied to one input of an EXCLUSIVE OR circuit 24, which via the switching control block 25 operates the switches to reverse the direction of repeater R. A similar operation occurs at all other stations. When circuit 23 times out, the input to circuit 24 is removed, so that repeater R reverts to its normal direction of operation.

Detector 22 looks for messages from master terminal TM which it recognizes since each message includes in its address portion the address of the originating terminal as well as that of the intended destination terminal. Hence, detector 22 delivers an output each time a message from master terminal TM arrives at or passes through the terminal shown, and these outputs are applied to a block 26 labelled monostable control. This includes a re-triggerable monostable and checks for gaps in the master terminal transmission. Hence, when there has been a period of time longer than a pre-set "dead-line" with no master terminal transmission, the monostable in block 26 times out and sets a flip flop 27, the output of which energizes the other input of EXCLUSIVE OR 24, with the result that repeater R is reversed.

Thus, reversal of repeater R is effected either at the end of a message, or when there is an excessively long gap in message transmission from master terminal TM. Monostable 26 is reset to its rest state when a message once again arrives, and then resets flip flop 27, so that repeater R is reversed to its normal state.

While I have described above the principles of my invention in connection with specific apparatus it is to be clearly understood that this description is made only by way of example and not as a limitation to the scope of my invention as set forth in the objects thereof and in the accompanying claims.

I claim:

1. A data transmission system of the closed-loop type having a plurality of stations coupled to a closed-loop comprising:

a first station of said plurality of stations transmitting a message to a second station of said plurality of stations, said message having a header portion including at least an address of said second station and being transmitted around said loop in a given direction from said first station to said second station, said second station responding to said address and accepting said message after which said second station transmits a reply message to said first station in direction around said loop opposite said given direction, said transmission direction being returned to said given direction after reception of said reply message at said first station; and a reversible repeater included in each of said plurality of stations coupled to said loop to convey said message and said reply message around said loop, all of said repeaters being reversed when said direction of transmission around said loop is reversed.

2. A system according to claim 1, wherein said plurality of stations is greater than two with one of said plurality of stations being a master station which controls all message transactions, each message transaction including a message from said master station to a selected one of the others of said plurality of stations followed by a reply message from said selected one of the others of said plurality of stations to said master station, said message from said master station in addition to being received at said selected one of the others of said plurality of stations continues around said loop to said master stations where its reception provides a check as to whether said loop is intact.

3. A system according to claim 2, wherein each of said others of said plurality of stations includes
   an end-of-message detector coupled to an associated one of said repeaters responsive to reception of an end of message portion of said message sent from said master station addressed to it to produce an output signal to cause reversal of said associated one of said repeaters, and
   a first timer coupled to said end-of-message detector and said associated one of said repeaters which reverses said reversal after a given time period to enable transmission of said reply message.

4. A system according to claim 3, wherein each of said others of said plurality of stations includes
   an additional detector coupled to said associated one of said repeaters responsive to reception of all of said messages transmitted from said master station to produce a control signal for each of said messages.
   a second timer coupled to said additional detector responsive to said control signals for actuation thereof when a predetermined time interval has passed without reception of a message from said master station, and means under control of said second timer to reverse said associated one of said repeaters causing an interruption in said messages from said master station at others of said others of said plurality of stations so that their associated ones of said repeaters will be reversed, said second timer and said means being responsive to resumption of reception of said messages from said master station to reverse said reversal of said associated one of said repeaters.

5. A system according to claim 2, wherein each of said others of said plurality of stations includes a detector coupled to said associated one of said repeaters responsive to reception of all of said messages transmitted from said master station to produce a control signal for each of said messages, a timer coupled to said detector responsive to said control signals for actuation thereof when a predetermined time interval has passed without reception of a message from said master station, and means under control of said timer to reverse said associated one of said repeaters causing an interruption in said messages from said master station at other of said others of said plurality of stations so that their associated ones of said repeaters will be reversed, said timer and said means being responsive to resumption of reception of said messages from said master station to reverse said reversal of said associated one of said repeaters.

6. A system according to claims 1, 2, 3, 4 or 5, wherein each of said repeaters includes first and second electrical to optical transducers each of which can also operate as an optical to electrical transducer depending on its biasing conditions, and an amplifying arrangement coupled to said first and second transducers, said first transducer being in coupled relation with one of two optical fibers interconnected by an associated one of said repeaters biased to operate as an optical to electrical transducer and coupled to the input of said amplifying arrangement and said second transducer being in coupled relation with the other of said two optical fibers biased to operate as an electrical to optical transducer and coupled to the output of said amplifying arrangement.

7. A system according to claims 1, 2, 3, 4 or 5, wherein each of said repeaters includes an amplifier, first and second electrical to optical transducers each of which can also operate as an optical to electrical transducer depending on its biasing condition, each of said first and second transducers being aligned with a different one of two optical fibers interconnected by an associated one of said repeaters, and a switching arrangement coupled to said amplifier, said first and second transducers and a bias source, said switching arrangement operating in said given transmission direction to bias said first transducer to operate as an optical to electrical transducer, to connect said first transducer to the input of said amplifier to bias said second transducer to operate as an electrical to optical transducer and to connect said second transducer to the output of said amplifier and said switching arrangement operating in said transmission direction opposite to said given direction to bias said first transducer to operate as an electrical to optical transducer, to connect said first transducer to the output of said amplifier, to bias said second transducer to operate as an optical to electrical transducer and to connect said second transducer to the input of said amplifier.

* * * * *